US012809628B2

(12) United States Patent
Oruganti et al.

(10) Patent No.: US 12,809,628 B2
(45) Date of Patent: Nov. 24, 2026

(54) MULTI-THREAD PROCESSING RECOMMENDATION

(71) Applicant: Oracle International Corporation, Redwood Shores, CA (US)

(72) Inventors: Satish Chandra Oruganti, Bengaluru (IN); Ganesh Kumar Gupta, Bangalore (IN); Michael Patrick Rodgers, Lake Oswego, OR (US)

(73) Assignee: Oracle International Corporation, Redwood Shores, CA (US)

(*) Notice: Subject to any disclaimer, the term of this patent is extended or adjusted under 35 U.S.C. 154(b) by 407 days.

(21) Appl. No.: 18/545,850

(22) Filed: Dec. 19, 2023

(65) Prior Publication Data

US 2025/0199809 A1 Jun. 19, 2025

(51) Int. Cl.

| | |
|---|---|
| ***G06F 9/30*** | (2018.01) |
| ***G06F 8/30*** | (2018.01) |
| ***G06F 8/41*** | (2018.01) |
| ***G06F 9/38*** | (2018.01) |

(52) U.S. Cl.

CPC .............. *G06F 9/3009* (2013.01); *G06F 8/30* (2013.01); *G06F 8/433* (2013.01); *G06F 9/3888* (2023.08)

(58) Field of Classification Search

CPC ... G06F 8/30; G06F 8/433; G06F 8/75; G06F 9/3009; G06F 9/3888; G06F 21/563

See application file for complete search history.

(56) References Cited

U.S. PATENT DOCUMENTS

| | | | | |
|---|---|---|---|---|
| 11,714,616 | B2 * | 8/2023 | Goodwin | G06F 8/434 717/144 |
| 11,748,072 | B2 * | 9/2023 | Cappello | G06F 8/443 717/110 |
| 12,106,080 | B2 * | 10/2024 | Hoffman | G06F 8/425 |
| 12,468,808 | B2 * | 11/2025 | Watanabe | G06F 21/563 |

* cited by examiner

*Primary Examiner* — Andy Ho

(74) *Attorney, Agent, or Firm* — Invoke

(57) ABSTRACT

A system analyzes a set of static source code to identify source code segments that may be implemented using parallel multi-thread processing at run-time. The system determines whether source code segments meet multi-threading criteria, including lacking operational data dependencies and having particular run time or computing resource consumption characteristics. Based on determining that the source code meets multi-threading criteria, the system modifies the static source code to utilize parallel multi-thread processing at run-time. The system generates a recommendation for a user based on the source code modification.

21 Claims, 11 Drawing Sheets

MULTI-THREAD PROCESSING RECOMMENDATION

TECHNICAL FIELD

The present disclosure relates to parallel multi-thread processing. In particular, the present disclosure relates to presenting and implementing modifications to source code to execute compiled code using parallel multi-thread processing at run-time.

BACKGROUND

Parallel multi-thread processing is used in various applications, including scientific computing, data processing, simulations, graphics rendering, and other scenarios where tasks can be divided into smaller, independent units of work that can be executed concurrently. In parallel multi-thread processing, a task to be performed by a set of code is divided into sub-tasks. The sub-tasks are executed in parallel to reduce a time required to complete the task. For example, a computer processor with four processing cores may execute four different sub-tasks in parallel.

In parallel multi-thread processing, threads typically share a memory space. Accordingly, if one thread modifies a set of data, it may affect operations of another thread that needs to access the same set of data. Multi-thread processes utilize synchronization methods to ensure execution order for sub-tasks. Examples of synchronization mechanisms include locks and semaphores.

The approaches described in this section are approaches that could be pursued, but they are not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
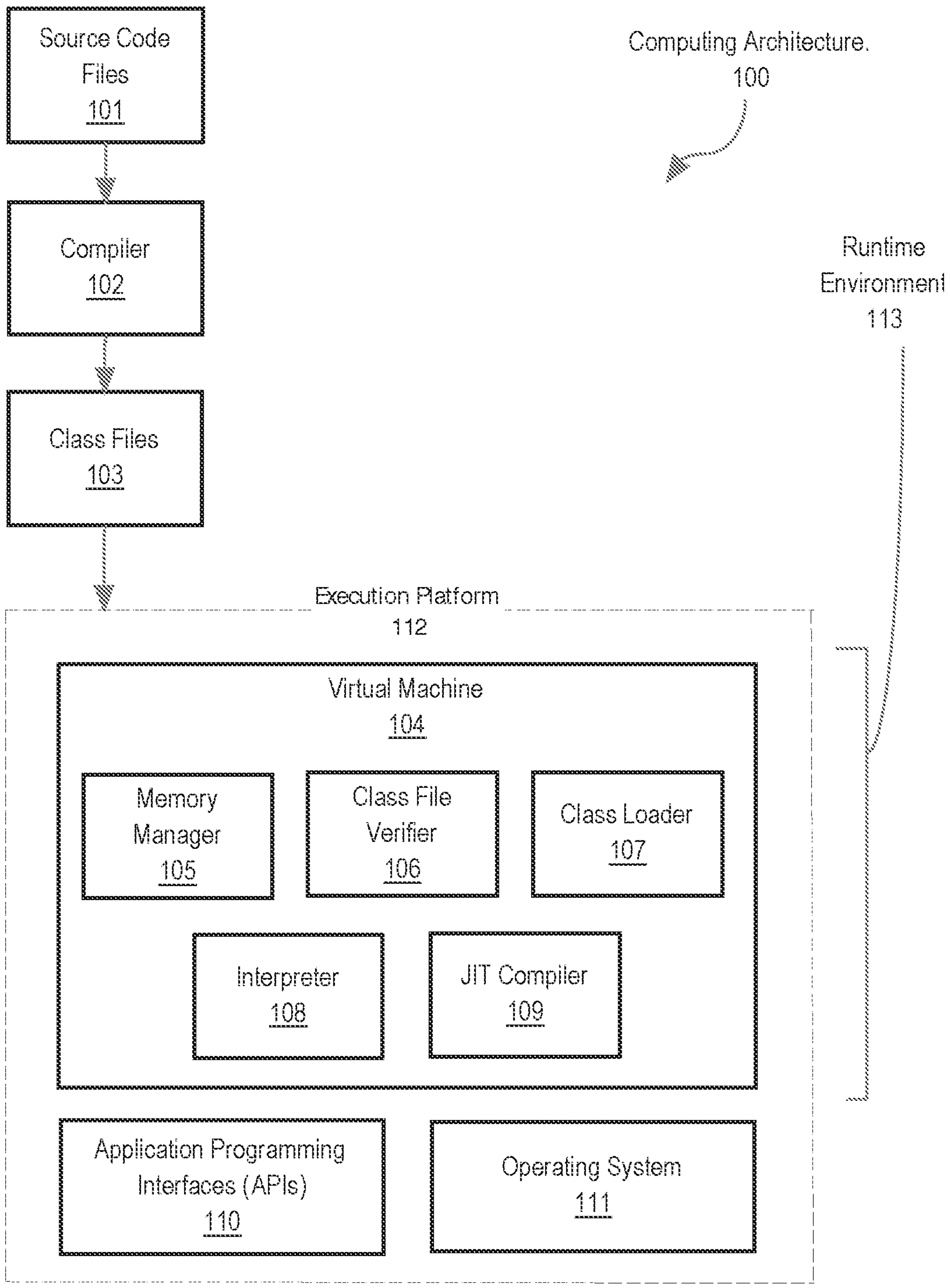
FIG. 1 illustrates an example computing architecture in which techniques described herein may be practiced.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present embodiment.

1. General Overview
2. Architectural Overview
   - 2.1 Example Class File Structure
   - 2.2 Example Virtual Machine Architecture
   - 2.3 Loading, Linking, and Initializing
3. Multi-Threading Recommendation Architecture
4. Modifying Source Code to Implement Parallel Multi-Thread Processing
5. Machine Learning Model Training
6. Example Embodiment
7. Hardware Overview
8. Miscellaneous; Extensions

1. General Overview

One or more embodiments analyze a set of source code to identify source code segments that may be implemented using parallel multi-thread processing at run-time. For example, a system may identify a particular type of operation represented in source code that is a candidate for multi-threading. Operation types may include, for example, summing, counting, sorting, or comparison operations. Operations may include, for example, loop-implemented operations and iteratively-performed operations. The system determines whether the code segments meet criteria for multi-threading recommendation or modification. For example, the system may determine that if a particular loop operation does not involve a data dependency among variables as the loop operation executes, the loop operation source code segment is a candidate for implementing multi-threading techniques. On the other hand, if the system determines that the loop operation involves a data dependency among variables as the loop operation executes, the system may determine that the loop operation source code segment is not a candidate for implementing multi-threading techniques. As another example, the system may determine that if a loop operation terminates within a threshold number of operations, it does not meet criteria for modifying the source code to implement multi-threading of the loop operation. In other words, executing a very small number of loops using multiple threads may not be an efficient use of computing resources. On the other hand, if the system determines that (a) a loop operation executes a number of times exceeding the threshold and (b) the loop operation does not have any data dependency with other source code segments, then the system may determine that the loop operation meets the criteria for modifying the source code to implement parallel multi-thread processing.

One or more embodiments modify source code by incorporating content into the source code that specifies a number of threads to be generated to implement the operations specified in the source code. In addition, or in the alternative, one or more embodiments insert a compiler directive into the source code to direct a compiler to implement parallel multi-thread processing for executing a particular segment of source code being compiled. According to yet another example embodiment, a system may apply a set of rules to rewrite the source code into a format that corresponds to automatic implementation of parallel multi-threading processing. For example, a compiler may automatically implement parallel multi-threading processing when source code is formatted in a particular way. A set of source code that is formatted one way may be compiled into machine code that does not utilize parallel multi-threading techniques when executed. A set of source code that performs the same function and that is formatted another way may be compiled into a set of machine code that is implemented using parallel multi-threading processing. The system may apply a set of rules to identify variables and operations associated with a particular set of source code. The system may rewrite the source code to generate a new set of source code including the same variables and performing the same operations. However, the new set of source code is formatted in such a way that a compiler generates machine code that implements parallel multi-threading processing to perform the operations.

In an example, a system may identify a loop-type operation in a set of static source code that sequentially parses content in a multi-page document. Based on determining that the parsing operation does not include any data dependency between one execution of the loop and the next, the system modifies the static source code to implement the parsing of the content in the multi-page document using parallel multi-thread processing, such as by inserting code specifying a thread class into JAVA source code. The modification of the static source code configures the source code such that different executions of the loop-type operation are performed by different threads. In a multi-core processing environment, the different threads are executed in parallel on two or more processing cores. If the loop is configured to execute 20,000 times based on the content in the multi-page document, the system may determine that the modification of the static source code to allow for parallel multi-thread processing may result in improved run-time performance of 50% or more, depending on the number of threads implemented and the number of threads that may be executed in parallel. The system may generate a notification for a user to confirm or reject the recommended modification.

One or more embodiments use a trained machine learning model to predict a number of processing threads associated with a particular source code segment. A system trains a machine learning model with data sets including historical source code segments and multi-threading data associated with the historical source code segments. The multi-threading data may specify whether compiled code corresponding to the source code was implemented with parallel multi-thread processing. The multi-threading data may include performance data associated with parallel multi-thread processing. For example, the multi-thread data may specify a value representing a run time associated with executing compiled code corresponding to the source code segment. The multi-threading data may specify a number of threads that were used to execute compiled code corresponding to the source code segment. The multi-threading data may specify a multi-threading categorization for the data. Example categorizations include the following: (a) a set of source code may not be implemented with parallel multi-thread processing, (b) the set of source code may be implemented with multi-threading techniques without modification to the source code, (c) the set of source code may be implemented with multi-threading techniques if the source code is modified, and (d) it is not clear whether the set of source code may be implemented with multi-threading techniques. During training, a machine learning model learns patterns associated with source code. For example, a machine learning model may learn via training on the training data set that certain types of operations represented in source code may be modified to utilize parallel multi-thread processing. The machine learning model may learn via training on the training data set to predict execution times for machine code corresponding to source code segments based on training data in which machine code utilizes parallel multi-thread processing and training data in which the machine code does not utilize parallel multi-thread processing. The machine learning model may learn a number of threads associated with source code segments that, based on the training data, is determined to be "optimal" or to match a set of performance criteria most closely, such as run time and resource utilization. The system may implement the machine learning model by providing source code segments to the model as input data. The machine learning model may generate output predictions based on the input source code segments. For example, a trained machine learning model may predict a performance improvement for executing machine code corresponding to a source code segment if the machine code is executed using parallel multi-thread processing. Another trained model may predict a number of threads to use to execute machine code. Another trained model may categorize a source code segment according to the following categories: (a) a set of source code may not be implemented with parallel multi-thread processing, (b) the set of source code may be implemented with multi-threading techniques without modification to the source code, (c) the set of source code may be implemented with multi-threading techniques if the source code is modified, and (d) it is not clear whether the set of source code may be implemented with multi-threading techniques.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 that are compiled by a compiler 102 into class files 103 representing the program to be executed. The class files 103 are then loaded and executed by an execution platform 112, that includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (that may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code that is written according to a specification directed to the convenience of the programmer, to either machine or object code that is executable directly by the particular machine environment, or an intermediate representation ("virtual machine code/instructions"), such as bytecode that is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) that are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both) and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions that replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above-described example, such as tiered compiling.

To provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of that includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
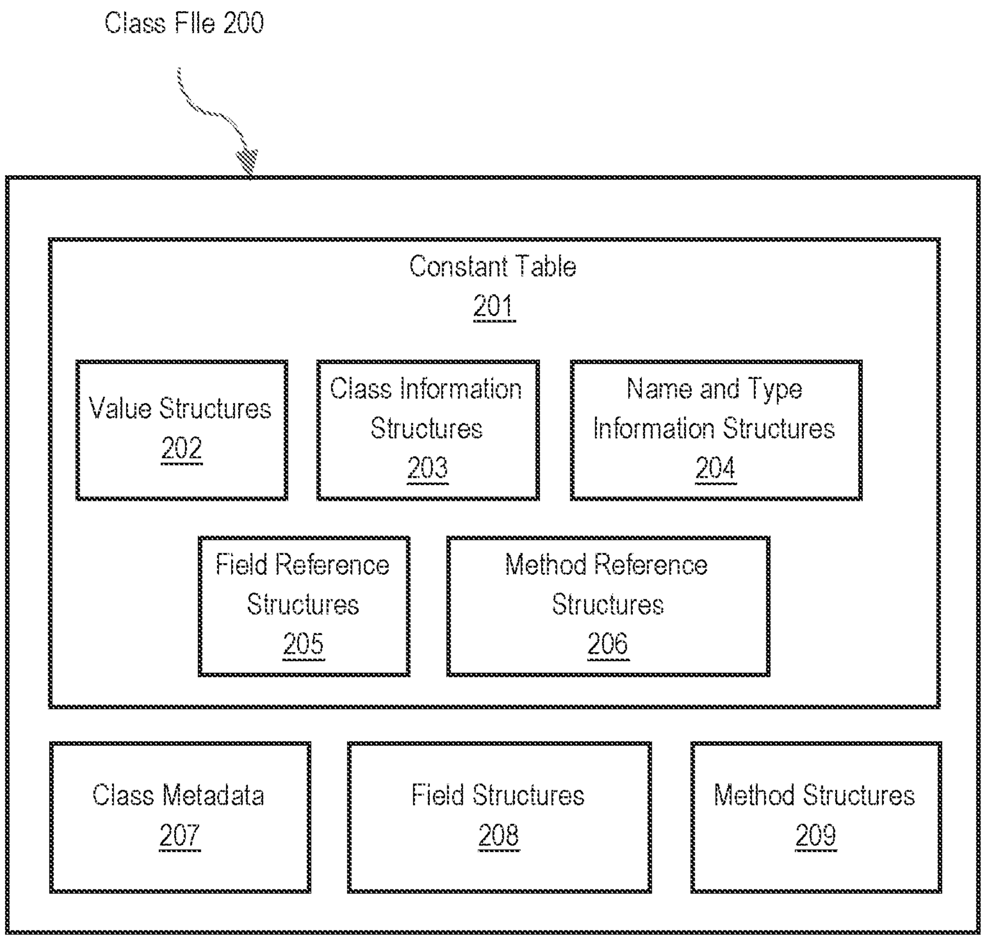
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure that, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures that index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g., "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations that reference entries of the constant table 201. Using Java as an example, consider the following class:

```
class A
{
int add12and13( ) {
return B.addTwo(12, 13);
}
}
```

In the above example, the Java method add12and13 is defined in class A, takes no parameters, and returns an integer. The body of method add12 and13 calls static method addTwo of class B that takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I) I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
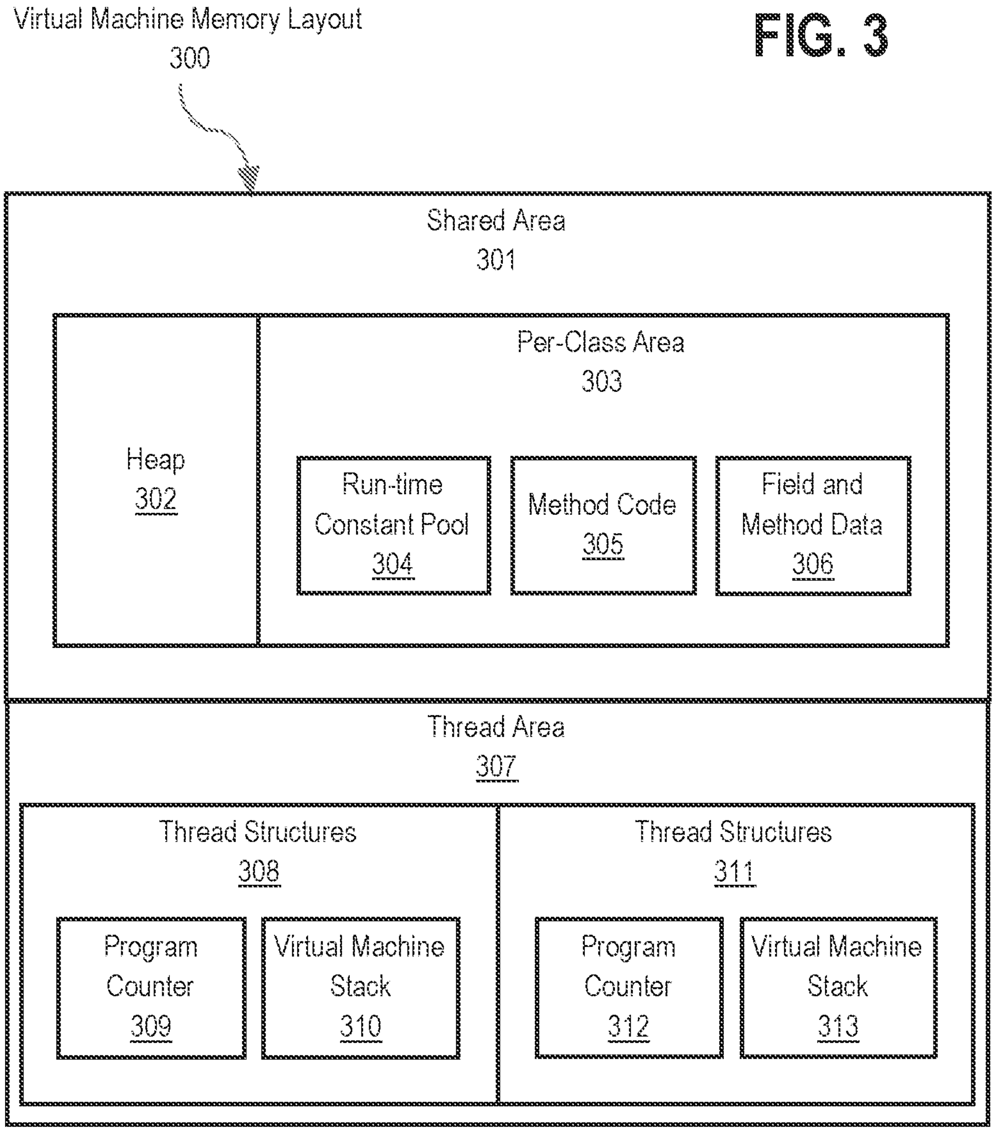
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field, and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. To provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
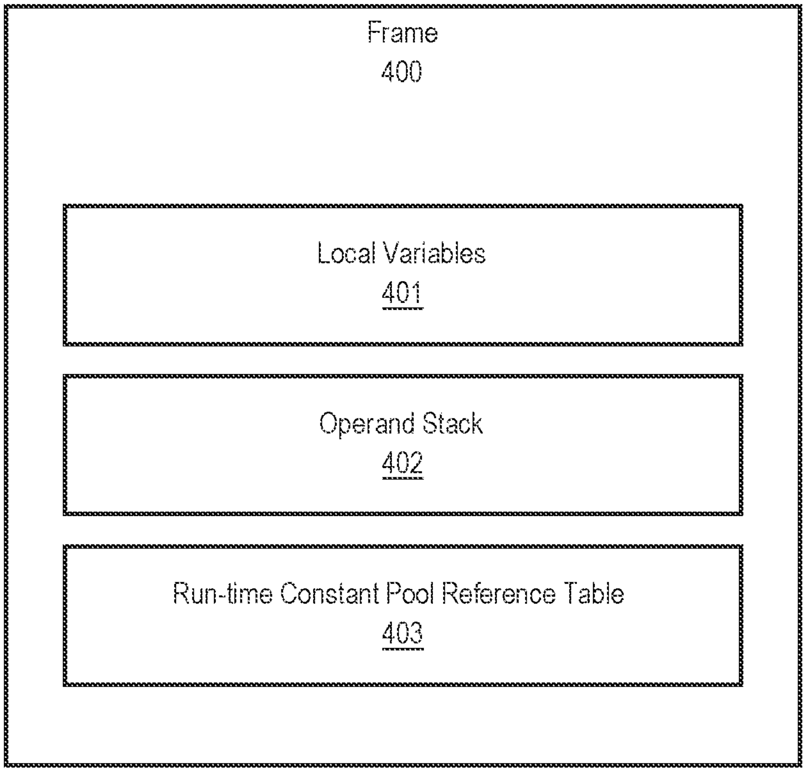
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class that in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 that loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception that is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking, and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists that might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Multi-Threading Recommendation Architecture

Figure 5:
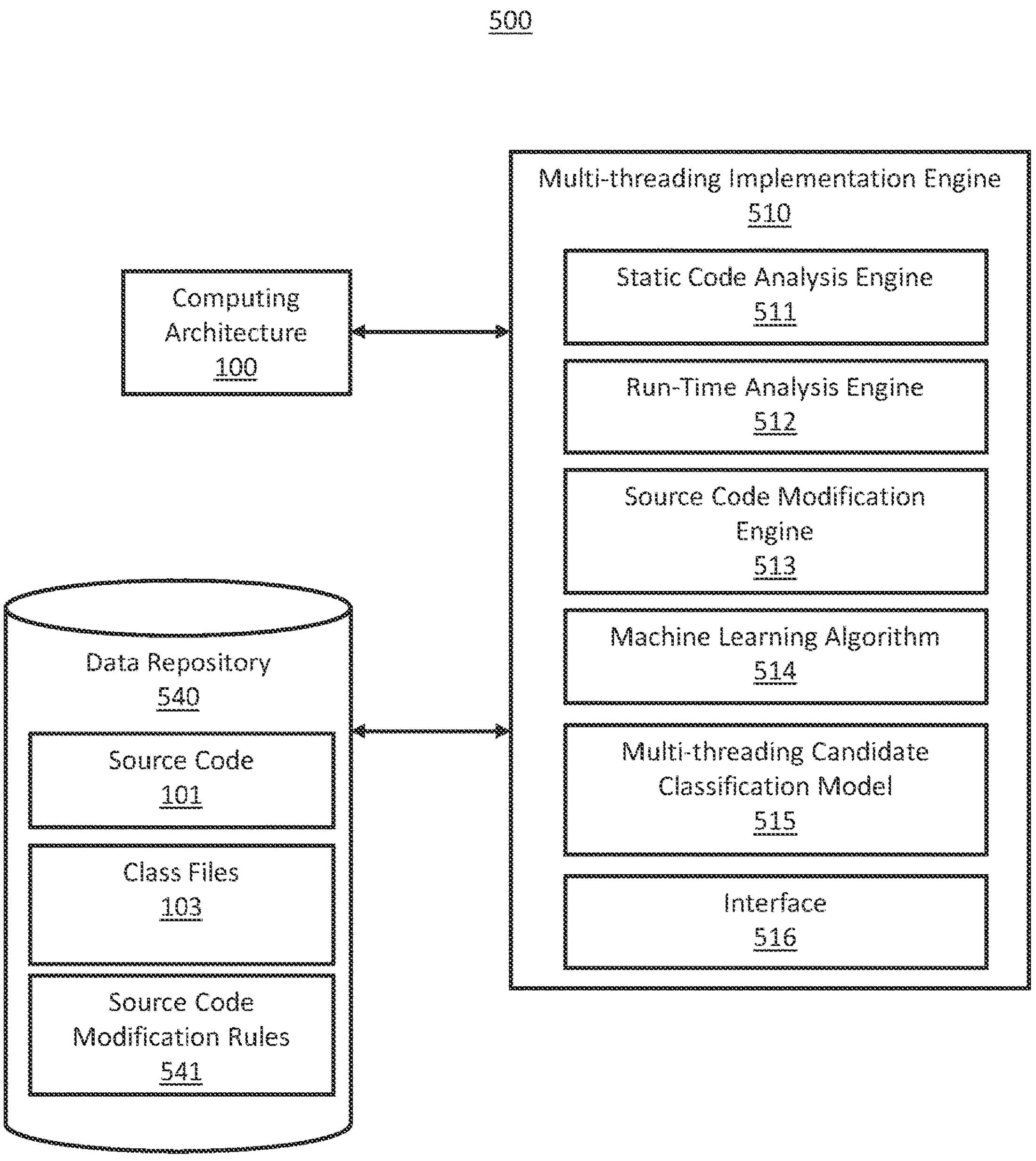
FIG. 5 illustrates a system in accordance with one or more embodiments.

FIG. 5 illustrates a system 500 in accordance with one or more embodiments. As illustrated in FIG. 5, system 500 includes a computing architecture 100, as described in FIG. 1, a multi-threading implementation engine 510, and a data repository 520. In one or more embodiments, the system 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component.

In one or more embodiments, multi-threading implementation engine 510 refers to hardware and/or software configured to perform operations described herein for recommending source code segments for applying parallel multi-thread processing. Examples of operations for recommending source code segments for applying parallel multi-thread processing are described below with reference to FIG. 6.

In an embodiment, the multi-threading implementation engine 510 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, a data repository 540 is any type of storage unit and/or device (e.g., a file system, database, collection of tables, or any other storage mechanism) for storing data. Further, a data repository 540 may include multiple different storage units and/or devices. The multiple different storage units and/or devices may or may not be of the same type or located at the same physical site. Further, a data repository 540 may be implemented or executed on the same computing system as the multi-threading implementation engine 510. Additionally, or alternatively, a data repository 540 may be implemented or executed on a computing system separate from the multi-threading implementation engine 510. The data repository 540 may be communicatively coupled to the multi-threading implementation engine 510 via a direct connection or via a network.

Information describing the source code 101, class files 103, and source code modification rules 141 may be implemented across any of components within the system 500. However, this information is illustrated within the data repository 540 for purposes of clarity and explanation.

In an embodiment, the multi-threading implementation engine 510 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

A static code analysis engine 511 analyzes source code files 101 to identify portions of the source code files 101 that are candidates for parallel multi-thread processing. For example, the static code analysis engine 511 may identify loop-type code structures and data structures that implement iterative processes or a process that repeats and uses a result of a previous iteration in a subsequent iteration. The static code analysis engine 511 may identify code control flow to identify tasks that may be executed independently from each other. For example, the static code analysis engine 511 may identify branches and conditional statements that can execute concurrently. The static code analysis engine 511 may predict whether a particular segment of source code is likely to be long-running or compute-intensive. A long-running task may include, for example, an iterative task that includes a number of iterations exceeding a threshold. Compute-intensive tasks includes may, for example, be characterized by, for example, a number of branches, a number of mathematical algorithms or computations, or a number of modifications to variables that exceed respective thresholds. The static code analysis engine 511 identifies data dependencies among portions of source code. The static code analysis engine 511 identifies source code segments as candidates for parallel multi-thread processing based on whether the segments include dependencies with other segments. For example, if a process is iterative and compute-intensive but also includes a dependency during the iterative process, the static code analysis engine 511 may reject the code segment as a candidate for parallel multi-thread processing. The dependency analysis may classify different dependencies as either multi-threading candidates or not. For example, a dependency that repeatedly compares a computed value to a threshold value may not be a multi-threading candidate. A dependency that includes a simple summing of a large set of numbers may be a multi-threading candidate since the value of a final sum would not change if multiple-processes simultaneously summed sub-sets of numbers.

In one or more embodiments, a machine learning algorithm 514 trains a multi-threading candidate classification model 515 to identify static code segments that are candidates for multi-threading processes. The machine learning algorithm 514 can be iterated to train a target model f that best maps a set of input variables to an output variable. A machine learning algorithm may include supervised components and/or unsupervised components. Various types of algorithms may be used, such as linear regression, logistic regression, linear discriminant analysis, classification, and regression trees, learning vector quantization, support vector machine, and/or backpropagation.

In an embodiment, a set of training data includes datasets and associated labels. The datasets are associated with input variables (e.g., static code segment characteristics, such as a type of process represented, a size of data used by a static code segment, and a number of variables accessed and/or modified by the static code segment) for the target model f. In one or more embodiments, the input variables for the static code segment includes measured or estimated performance characteristics. For example, a system may estimate or measure a run time of a set of machine code corresponding to a source code segment. In addition, or in the alternative, the system may estimate or measure a computing resource usage of the set of machine code corresponding to the source code segment. The associated labels are associated with the output variable (e.g., a performance improvement achieved by implementing parallel multi-thread processing, a number of threads with which to execute the compiled static code segment, and/or a multi-threading implementation category of the static code segment) of the target model f. The training data may be updated based on, for example, feedback on the accuracy of the current target model f. Updated training data is fed back into the machine learning algorithm that in turn updates the target model f.

A machine learning algorithm is an algorithm that can be iterated to train a target model f that best maps a set of input variables to an output variable, using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm that in turn updates the target model f.

A machine learning algorithm 514 generates a target model f such that the target model f best fits the datasets of training data, including static source code segment characteristics, to the labels of the training data. Additionally, or alternatively, a machine learning algorithm 114 generates a target model f such that when the target model f is applied to the datasets of the training data, a maximum number of results determined by the target model f matches the labels of the training data. Different target models may be generated based on different machine learning algorithms and/or different sets of training data.

In an embodiment, a machine learning algorithm can be iterated to learn whether particular source code segments are candidates for implementing multi-threading processes. In an embodiment, a set of training data includes historical or synthetically-generated source code segments. The source code segments are associated with labels, indicating a classification of the source code segment as being a multi-threading process candidate or not. According to one example embodiment, the classification includes a number of threads. The number of threads may correspond to a historically identified optimal number of threads associated with executing a particular source code segment, for example.

A run-time analysis engine 512 analyzes performance of execution of class files 103 on the execution platform 112, as described in FIG. 1, to identify execution attributes of source code segments. For example, the run-time analysis engine 512 may determine that when a particular source code segment was executed as compiled machine code, it satisfied one or more multi-threading criteria. For example, the run-time analysis engine 512 may determine that a segment of compiled code (such as machine code) was associated with a high level of compute resource utilization or a long execute time, exceeding pre-defined threshold values. The run-time analysis engine 512 identifies characteristics associated with source code that may not be apparent from the static source code. For example, a set of static source code may include a particular function call to an external application. It may not be apparent from the static source code what effect the function call will have at execution time. Accordingly, the static code analysis engine 511 may not be able to determine whether the source code segment meets a set of parallel multi-thread processing criteria. However, the run-time analysis engine 512 may determine, based on measured run-time data of compiled machine code corresponding to the static source code, that the function call results in a level of computing-resource usage exceeding a threshold. The run-time analysis engine 512 may consequently classify the corresponding source code segment as a candidate for applying parallel multi-thread processing.

A source code modification engine 513 applies a set of source code modification rules 141 to generate a modified set of source code that implements parallel multi-thread processing. The modified set of source code may include, for example, a same set of variables to be used in a set of processes in the source code segment. For example, if a source code segment performs a complex calculation on a set of variable values, the source code modification engine 513 modifies the source code to perform the same complex calculation on the same set of variable values using parallel multi-thread processing. The modifications to the source code may include (a) modifications to the set of source code that specify two or more threads for performing the process, (b) modifications to the set of source code to format the code in such a way that a compiler automatically compiles the source code to generate compiled code that utilizes parallel multi-thread processing, and (c) insertion of a compiler directive preceding the source code segment to direct a compiler to implement the source code segment using parallel multi-thread processing. In one or more embodiments, the source code modification rules 141 include, for example, the following: a number of threads to be generated based on source code segment characteristics, naming conventions for the threads, rules for assigning priority values to the threads, and stack data associated with a stack for storing thread data.

In one or more embodiments, interface 516 refers to hardware and/or software configured to facilitate communications between a user and a multi-threading implementation engine 510. Interface 516 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 516 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 516 is specified in one or more other languages, such as Java, C, or C++.

In one or more embodiments, the interface 516 renders a GUI to allow a user to specify one or more source code modification rules 141. For example, a user may set configuration values associated with a number of threads to be generated and/or used to implement processes. The user may set rules that cause a computer to automatically create a number of threads to execute a set of code based on factors such as the following: a type of process being performed (e.g., a loop-type function, mathematical calculations, a branch-type function), a number of total processing cores available for executing parallel threads, a priority value assigned to a particular source code segment, or a process implemented by the source code segment, estimated compute resources utilized by the source code segment, and estimated run-time associated with the source code segment. Based on the user input, the system may store a set source code modification rules 141.

A multi-threading implementation engine 510 communicates with the computing architecture 100 to generate recommendations and modify to source code to implement parallel multi-thread processing. In one or more embodiments, multi-threading implementation engine 510 refers to hardware and/or software configured to perform operations described herein for generating recommendations and modify to source code to implement parallel multi-thread processing. Examples of operations for generating recommendations and modifications to source code to implement parallel multi-thread processing are described below with reference to FIG. 6.

4. Modifying Source Code to Implement Parallel Multi-Thread Processing

Figure 6:
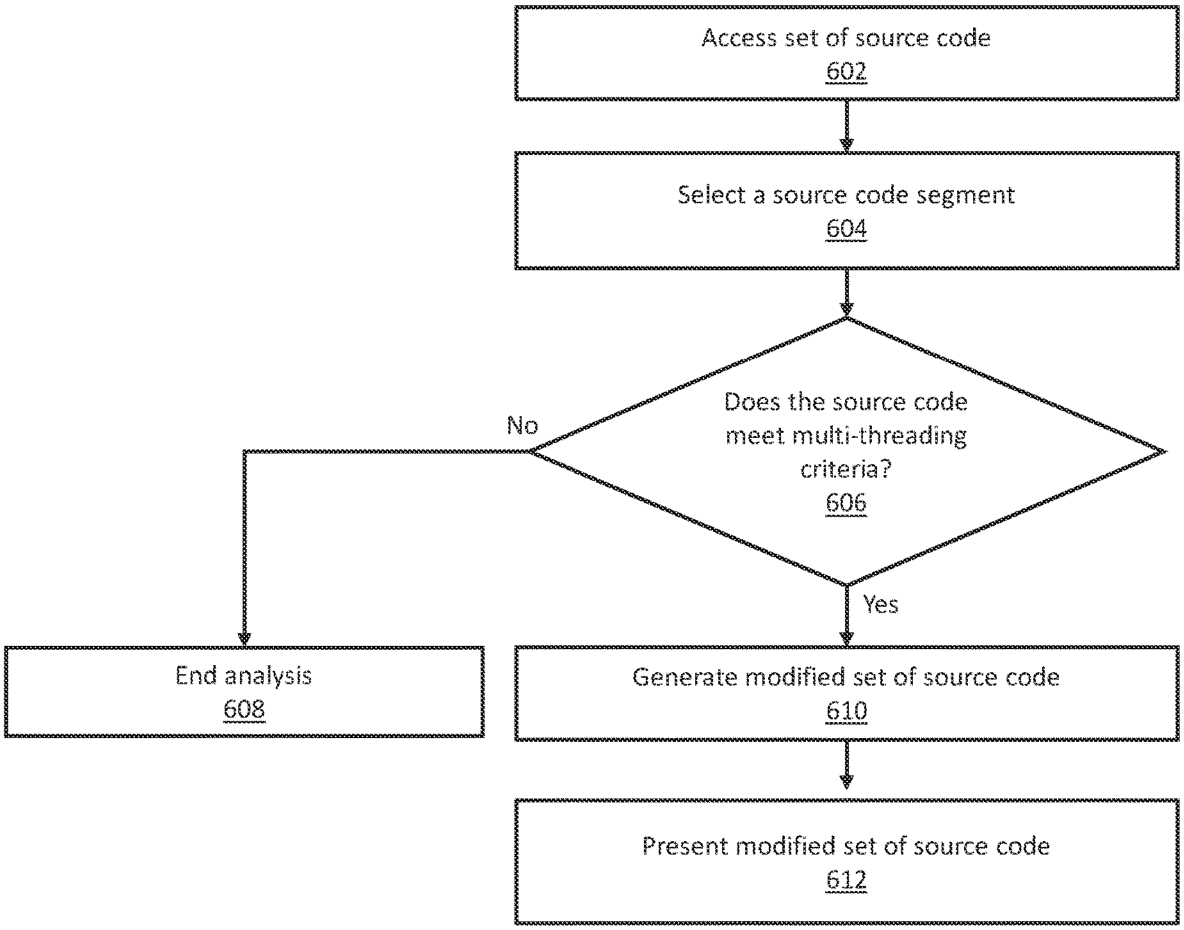
FIG. 6 illustrates an example set of operations for modifying source code to implement parallel multi-thread processing in accordance with one or more embodiments.

FIG. 6 illustrates a flowchart showing techniques for generating recommendations and modifying source code to implement parallel multi-thread processing. One or more operations illustrated in FIG. 6 may be modified, rearranged, or omitted. Accordingly, the particular sequence of operations illustrated in FIG. 6 should not be construed as limiting the scope of one or more embodiments.

A system accesses a set of source code (Operation 602). The source code may be written in one or more programming languages, such as PYTHON, C++, or JAVA. The source code includes one or more segments that are compiled and executed to perform one or more functions. The segments may be characterized by start and end sets of parentheses, brackets, or carrots, for example.

The system selects a particular source code segment for analysis (Operation 604). For example, the system may sequentially select each segment separated by start/end punctuation in the source code. The system may analyze source code segments according to hierarchies. For example, if a source code segment includes one set of operations with a corresponding set of start/end punctuation nested within another set of operations corresponding to another set of start/end punctuation, the system may select each set of operations as a separate source code segment. The system may analyze the entire source code file for particular types of operations. The system may select the source code corresponding to the particular types of operations as source code segments. The system may refrain from selecting, for analysis, other portions of the source code that exclude the particular types of operations.

The system analyzes the source code to identify source code segments that meet parallel multi-thread processing criteria (Operation 606). For example, the system may identify types of methods, functions, and operations that may be multi-threading candidates. According to one embodiment, the system identifies particular code structures as matching predefined candidate structures. For example, the system may determine that the particular structure of source code embodied in a method would, when executed as compiled code, perform an iterative operation or a loop operation. According to an embodiment, the system parses the source code to identify the different components, including method names, function names, variable names, variable values, data type names, explanatory notations, initialization operations, operands, calls, interrupts, punctuation or syntax, and any other components that make up the source code. The system may tokenize the parsed source code to identify different components described above. For example, the terms "public," "class," "Main," "void," "static," and the symbols "(", ")", "{", "//", and ":" may all be identified as separate tokens. The system searches the parsed and/or tokenized source code content to identify patterns matching multi-threading candidate patterns. An example pattern may include a token representing a particular function type, such as a counting function or a summing function, applied to a variable representing a particular data type, such as a matrix of values.

The system may trace components through multiple different source code segments. For example, if a source code segment specifies a particular variable, the system may search other source code segments for initialization of the variable and other functions that use the variable. Similarly, if a source code segment identifies a particular memory address, the system may search other source code segments for other functions that access data at the same memory address. Examples of types of functions and operations include matrix summing, matrix sorting, matrix multiplication, matrix searching, data parsing, data filtering, data analysis (e.g., identifying particular values within a set of data), visual graphics processing, network requests, disk input/output operations, web server request handling, query request handling, reading data from a file, and writing data to two or more files.

According to an example embodiment, a system may identify loop-type functions and iterative functions within source code as types of functions that may be multi-threading candidates. The system may determine that a particular pattern of tokens, including a method name corresponding to a particular method, in combination with a particular set of variable values for a corresponding set of variables corresponds to a loop-type function. The system may determine whether an identified loop-type function executes a number of times exceeding a threshold. For example, the system may be configured to consider a loop-type function for parallel multi-thread processing if the loop executes more than 10,000 times. The system may further identify branches and conditional statements that can execute concurrently.

Identifying segments of source code as multi-threading candidates may include estimating a run-time of the source code segment. For example, one loop-type function may repeat a simple calculation 10,000 times. Accordingly, the loop-type function may have an estimated run-time less than a threshold. Another loop-type function may repeat a complex function call 10,000 times. Accordingly, the latter loop-type function may have an estimated run time greater than the threshold. The system may identify the latter loop-type function as a candidate for multi-threading and the former loop-type function as not being a candidate for multi-threading.

In addition, or in the alternative, identifying a segment of source code as a multi-threading candidate may include estimating computing resources that would be used by the compiled source code during execution. The system may estimate compute resources based on a set of factors including the following: a number and complexity of functions and calculations performed within a source code segment, a number and type of variables generated and/or accessed within the source code segment, a number of iterations or loops executed by an iterative process or a loop-type function, a number of branches or conditional statements within a source code segment, and a length of the source code segment. A compute-intensive task includes tasks that include, for example, a number of branches, a number of mathematical algorithms or computations, or a number of modifications to variables that exceed respective thresholds.

In one or more embodiments, the system determines the run time of a source code segment by compiling the source code and executing the compiled code. The system may monitor the execution of the code to identify the run time of the compiled code that corresponds to the source code segment. In one or more embodiments, the system determines the computing resources required to execute a source code segment by compiling the source code and executing the compiled code. The system may monitor the execution of the code to identify the computing resources required to execute a portion of the compiled code that corresponds to the source code segment.

In one or more embodiments, identifying a source code segment as a candidate for parallel multi-thread processing includes determining whether a source code segment includes an operational dependency on any other source code segment. For example, if one source code segment utilizes a particular variable that is manipulated by another source code segment, the former source code segment may not be a candidate for parallel multi-thread processing. On the other hand, if two source code segments read a value of the variable without altering the value, the source code segments may be candidates for parallel multi-thread processing. According to one example embodiment, the system identifies tokens representing variables and data sets used by and generated by particular source code segments. In an example in which the system identifies a set of source code as corresponding to a loop-type operation, the system analyzes the source code to determine whether the variables and data sets are used in multiple operations of the loop. In an example in which the system identifies a set of source code as corresponding to an iterative operation, the system analyzes the source code to determine whether the variables and data sets are used in multiple iterations of the iterative operation. The system further traces the generation and manipulation of variables and data sets among multiple different source code segments within a set of source code. For example, one source code segment may write a value to a location in memory. Another source code segment may access the value from the location in memory and increment it using a loop-type operation. In its analysis of source-code segment corresponding to the loop-type operation, the system identifies the dependency from the loop-type operation to the source code segment that writes the value to the location in memory.

According to one example embodiment, determining whether a source code segment is a candidate for parallel multi-threading operations includes determining that it does not access the same data set as another source code segment. According to another example, the system may determine that a source code segment is a candidate for parallel multi-threading operations based on determining that the source code segment may be performed before or after another source code segment accessing the same data set without altering a result of operations associated with the source code segments.

One or more embodiments identify candidate source code segments for applying parallel multi-thread processing based on a combination of one or more of the following: long-running tasks, compute-intensive tasks, whether tasks include data dependencies to other tasks, loop-type functions, iterative-type functions, and control flow code that may be executed in parallel. In other words, upon identifying a type of task that may be a candidate for multi-threading, such as an iterative-type task, the system further estimates computing resources used by the task and whether the task includes data dependencies. An iterative-type task with a low computing-resource usage may not be a candidate for multi-threading. Similarly, an iterative-type task with data dependencies to other tasks may not be a candidate for multi-threading. On the other hand, an iterative-type task associated with a high computing-resource-usage level and without data dependencies may be a candidate for implementing parallel multi-thread processing.

According to one embodiment, the system categorizes the source code segments based on a graded scale. The categories may include the following: (a) a source code segment is a candidate for parallel multi-thread processing, (b) the source code segment is not a candidate for parallel multi-thread processing, (c) the source code segment would be a candidate for parallel multi-thread processing if re-written, and (d) the system cannot determine if the source code segment is a candidate for multi-threading.

If the system cannot determine whether a source code segment is a candidate for parallel multi-thread processing, the system may either (a) treat the source code segment as a non-candidate for multi-threading or (b) flag the source code segment for human review.

According to one or more embodiments, the system applies a trained machine learning model to a set of source code to identify candidate source code segments for parallel multi-thread processing. For example, the system may train a neural network on a data set of source code segments. Each source code segment corresponds to a label. The label may specify one or more of (a) whether compiled code corresponding to the source code was, or could be, implemented using parallel multi-thread processing, (b) a number of threads that were, or may be, used to execute the compiled code, and (c) performance characteristics associated with the compiled code. In an example in which a source code segment corresponds to a historical (e.g., previously implemented and/or executed) set of source code, the number of parallel threads corresponds to the number of threads that were used to execute a set of compiled code corresponding to the source code segment. In another example, a source code segment may be synthetically generated to include a particular operation and a number of threads determined to be an optimal number for the particular operation. Upon being trained on the data set of source code segments, the machine learning model is configured to receive a target source code segment as input data and generate as output data a target number of threads for executing compiled code corresponding to the target source code segment. Accordingly, the trained machine learning model is a specialized computing device configured to perform a particular function of determining whether a source code segment should be a multi-thread processing candidate and how many threads should be used to execute the compiled code corresponding to the source code segment.

If the system determines that a source code segment is not a candidate for parallel multi-thread processing, the system ends the analysis of the source code segment (Operation 608). If the source code includes additional source code segments to be analyzed, the system may repeat the process of selecting a source code segment (Operation 604) and analyzing the source code segment (Operation 606).

If the system determines that the source code segment is a candidate for parallel multi-thread processing, the system generates a modified set of source code to implement parallel multi-thread processing (Operation 610). According to one example embodiment, the system applies a set of source-code-modification rules to modify the source code segment to implement parallel multi-thread processing. The source-code-modification rules may direct the system to specify (a) a particular number of threads to be generated for a particular operation type and (b) a naming convention to be applied to the threads. The system may generate source code that specifies the threads to be generated to execute the corresponding source code segment.

According to another example embodiment, the system modifies the source code to comply with a format that causes a compiler to utilize parallel multi-thread processing. For example, a set of source code that is initially written to be implemented as a "for" loop may be rewritten to generate a dynamic thread that automatically utilizes parallel multi-thread processing to execute a corresponding set of compiled code.

An example source code segment is provided below:

```
function processData (dataset) {
// perform some initial processing
let results=[ ];
for (let i=0; i<dataset.length; i++) {
// perform some calculations on the dataset
let value=dataset [i];
//store the results
results.push (value);
}
// perform some final processing
return results;
}
```

The system identifies the "for" loop in the above source code segment as a multi-threading candidate based on the function type (e.g., "for") and the lack of data dependencies with other source code segments. The system re-writes the source code segment to generate a dynamic thread to run calculations in parallel. The system re-rewrites the source code as follows:

```
function processData (dataset) {
// perform some initial processing
// create a new dynamic thread to perform the calculations
let worker=new Worker ('calculation.js');
//pass the dataset to the worker thread
worker.postMessage (dataset);
//listen for messages from the worker thread
worker.onmessage=function (event) {
// store the results
results.push (event.data);
// check if all results have been received
if (results.length===dataset.length) {
// perform some final processing
return results;
}}}
```

According to yet another example, the system modifies the source code by inserting a compiler directive into the source code to direct a compiler to implement parallel multi-thread processing for executing a particular segment of source code being compiled. The compiler directive may specify a number of threads to be generated to execute the compiled code, for example.

The system presents the modified set of source code to a user as a recommendation for modifying the source code (Operation 612). Upon a user confirmation, the system replaces the original source code with the modified source code. According to an alternative embodiment, the system may automatically, without user intervention, apply a set of source-code-modification rules to modify a set of source code to utilize parallel multi-thread processing. The system may, without user confirmation or intervention, replace a set of original source code with the modified source code.

5. Training a Machine Learning Model

Figure 7:
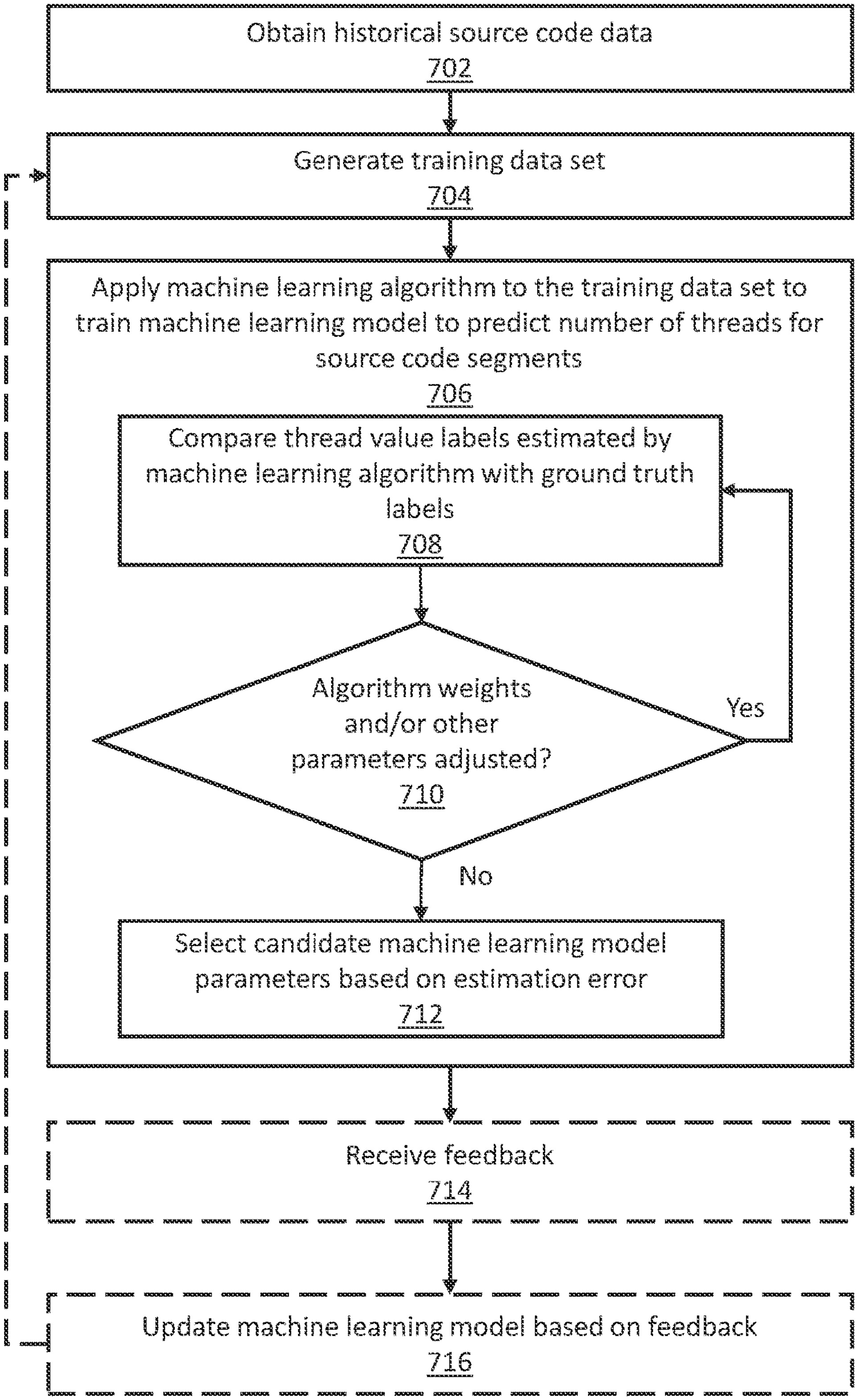
FIG. 7 illustrates an example set of operations for training a machine learning model to predict a number of threads for parallel multi-thread processing in accordance with one or more embodiments.

FIG. 7 illustrates an example set of operations for training a machine learning model to predict a number of threads to generate for implementing parallel multi-thread processing on a particular segment of source code in accordance with one or more embodiments. One or more operations illustrated in FIG. 7 may be modified, rearranged, or omitted. Accordingly, the particular sequence of operations illustrated in FIG. 3 should not be construed as limiting the scope of one or more embodiments.

In some embodiments, a system (e.g., one or more components of architecture 100 illustrated in FIG. 1) accesses historical source code data (Operation 702). Obtaining the historical source code data may include obtaining source code segments for programs and applications previously generated to be executed on a particular computing system. According to one or more embodiments, obtaining the historical source code data includes obtaining segments of source code such as sections bracketed by symbols representing the beginning of a function or method to be implemented and the end of the function or method. In one example, the symbols representing the start/end of a function in source code are open brackets and closed brackets. In one example, a system pre-processes a set of source code to identify source code segments bounded by the start/end symbols. For example, a set of source code may include hundreds of static source code segments bounded by start/end symbols, including nested source code segments bounded by start/end symbols. The system may pre-process the source code to identify source code segments bounded by start/end symbols at a particular hierarchal level. The system may identify source code segments that perform particular types of operations, functions, or tasks. The system may separate each portion of source code bounded by start/end symbols as a separate code segment. The system may further generate code segments that include one or more nested segments bracketed by start/end symbols.

In one or more embodiments, the system obtains synthetically-generated source code data in addition to, or instead of, the historical source code data. Synthetically-generated source code data may be generated to have characteristics for training the machine learning model. The synthetically-generated source code data may not be source code that has historically been implemented or developed for execution in a system. For example, the system may generate a set of synthetic source code data including a particular branch function that may be implemented with multi-threading techniques to train the machine learning model to predict multiple threads for implementing the particular branch function.

The system uses the historical source code data to generate a set of training data (Operation 704). The set of training data includes at least one classification label for a set of source code segment characteristics. For example, the system may identify in the historical source code data a particular function, a set of variables utilized by the function, a set of data accessed by the function, and a length of a source code segment that includes the function. The system may further identify in the historical source code data information specifying a number of threads used to execute the source code segment. The system generates one or more labels corresponding to the source code segment. One label may identify the source code segment as a candidate for implementation using multi-threading techniques. Another label may specify a number of threads associated with the source code segment. Another label may specify a type of function represented in the source code. Yet another label may specify a measured or estimated run time to execute compiled code corresponding to the source code.

According to one embodiment, the system obtains the historical data and the training data set from a data repository storing labeled data sets. The training data set may be generated and updated by an enterprise that generates source code. Alternatively, the training data set may be generated and maintained by a third party.

In some embodiments, generating the training data set includes generating a set of feature vectors for the labeled examples. A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include the following: information about an entity that generated the source code, a function that is specified in the source code such that executing the compiled source code would result in performance of the function, and a language or format of the source code and/or compiled code. Other example features include a number of variables utilized by a source code segment, a data set associated with the source code, an estimated or measured run time for the source code, and a number of threads utilized to execute compiled code corresponding to the source code. In some embodiments, a system generates one or more estimates or predictions that are used as features for source code. For example, the system may identify a run time of a function in the source code. The run time may be used as a feature. Additionally, or alternatively, the system may estimate the run time of the function. The system may generate the run-time estimate based on a type of function, a number of loops, iterations, and/or branches included in the function, a number of calculations performed by the function, and the types of calculations performed by the function. In some embodiments, a feature within a feature vector is represented numerically by one or more bits. The system may convert categorical attributes to numerical representations using an encoding scheme, such as one-hot encoding, label encoding, and binary encoding. One-hot encoding creates a unique binary feature for each possible category in an original feature. In one-hot encoding, when one feature has a value of 1, the remaining features have a value of 0. For example, if a type of function represented in source code has 10 different possible conditions, the system may generate ten different features of an input data set. When one condition is present (e.g., value "1"), the remaining features are assigned a value "0." According to another example, the system may perform label encoding by assigning a unique numerical value to each condition. According to yet another example, the system performs binary encoding by converting numerical values to binary digits and creating a new feature for each digit.

The system applies a machine learning algorithm to the training data set to train the machine learning model (Operation 706). For example, the machine learning algorithm may analyze the training data set to train neurons of a neural network with particular weights and offsets to associate particular source code segments with particular multi-thread prediction value labels. Generating the multi-thread prediction value labels may include identifying particular features in the source code segments and particular numbers of threads that correspond to the particular combinations of features.

In some embodiments, the system iteratively performs the following: apply the machine learning algorithm to a set of input data including a source code segment to generate an output set of labels including a value representing a number of threads, compare the generated labels to pre-generated labels associated with the input data, adjusts weights and offsets of the algorithm (e.g., of each neuron in a neural network) based on an error (e.g., a difference between the algorithm-generated label and the pre-generated label), and apply the algorithm to another set of input data including another source code segment. Additionally, or alternatively, the system may generate and train other candidate models, such as support vector machines, decision trees, Bayes classifiers, and/or fuzzy logic models, as previously described.

In some embodiments, the system compares the labels estimated through the one or more iterations of the machine learning model algorithm with ground truth labels to determine an estimation error (Operation 708). In an example in which the test set of examples is a set of historical source code segments, the ground truth labels may include the number of threads that were historically used to execute the compiled source code segments. According to an alternative embodiment in which the test set of examples includes synthetically-generated examples, the ground truth labels may include a number of threads assigned to the examples by a system or code developer. The system may perform this comparison for a test set of examples that may be a subset of examples in the training dataset that were not used to generate and fit the candidate models. The total estimation error for a particular iteration of the machine learning algorithm may be computed as a function of the magnitude of the difference and/or the number of examples for which the estimated label was wrongly predicted.

In some embodiments, the system determines whether to adjust the weights and/or other model parameters based on the estimation error (Operation 710). Adjustments may be made until a candidate model that minimizes the estimation error or otherwise achieves a threshold level of estimation error is identified. The process may return to Operation 708 to adjust and continue training the machine learning model.

In some embodiments, the system selects machine learning model parameters based on the estimation error meeting a threshold accuracy level (Operation 712). For example, the system may select a set of parameter values for a machine learning model based on determining that the trained model has an accuracy level for predicting a number of threads to be used to execute compiled source code of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction.

Additionally, or alternatively, the system may train other types of machine learning models. For example, the system may adjust the boundaries of a hyperplane in a support vector machine or node weights within a decision tree model to minimize estimation error. Once trained, the machine learning model may be used to estimate labels for new examples of source code segments.

In embodiments in which the machine learning algorithm is a supervised machine learning algorithm, the system may optionally obtain feedback on the various aspects of the analysis described above (Operation 714). For example, the feedback may affirm or revise labels generated by the machine learning model. The machine learning model may indicate that a particular source code segment is associated with a label predicting two threads or that the compiled source code should be executed as two threads executing in parallel on two processing cores. The system may receive feedback indicating that the source code segment should instead be associated with a label to execute the compiled source code as four threads executing in parallel on four processing cores. According to another example, a machine learning model may predict a particular run time for a set of compiled code corresponding to a source code segment. The system may receive feedback modifying the predicted run time. Based on the feedback, the machine learning training set may be updated, thereby improving its analytical accuracy (Operation 716). Once updated, the system may further train the machine learning model by optionally applying the model to additional training data sets of source code segments.

One or more embodiments utilize one or more trained machine learning models to determine whether to modify source code to utilize parallel multi-thread processing and how many threads to use. While an example is provided above in which a machine learning model predicts a number of threads for executing compiled code corresponding to a source code segment, in one or more embodiments, the system trains the machine learning model to instead categorize the source code as being a candidate for multi-threading or not. For example, a machine learning model may be trained to classify a source code segment as follows: (a) a source code segment is a candidate for parallel multi-thread processing, (b) the source code segment is not a candidate for parallel multi-thread processing, (c) the source code segment would be a candidate for parallel multi-thread processing if re-written, and (d) the model cannot determine if the source code segment is a candidate for multi-threading. According to another example, the system trains a machine learning model to predict a run time of source code segments. Based on the predicted run times, the system determines an improvement between a run time of the source code segment when parallel multi-thread processing is utilized compared to when it is not. The system generates recommendations for modifying source code to implement parallel multi-thread processing based on the machine learning model run-time predictions.

6. Example Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

Figure 8A:
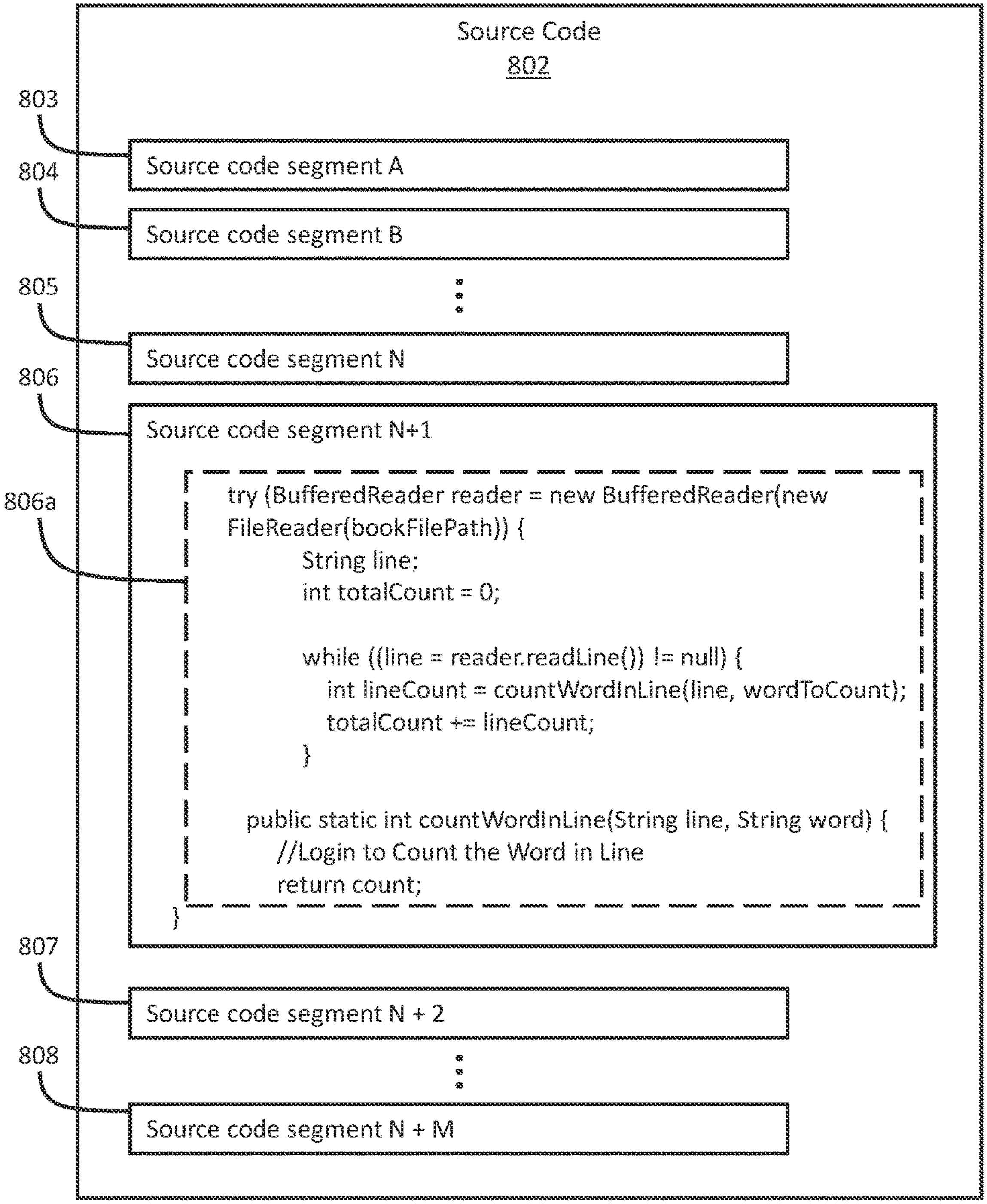
FIGS. 8A-8C illustrate an example embodiment.

FIG. 8A illustrates a set of source code 802. The set of source code 802 includes multiple different source code segments 803, 804, 805, 806, 807, and 808. Source code segments 803-808 may correspond to particular operations or sets of tasks.

A multi-thread implementation recommendation system analyzes the source code 802 to identify candidate source code segments for parallel multi-thread processing. The system may determine that source code segment A (803) is a type of segment that may utilize multi-threading, such as an iterative task. However, the segment 803 iterates a maximum of ten times, and the system estimates that the computing resource usage for the segment 803 would not meet a threshold level of resource usage. The system determines that source code content segment N (805) includes a data dependency from source code content segment B (804). The data dependency precludes the segment 805 from being executed utilizing parallel multi-thread processing. In other words, based on analyzing the source code 812, the system determines that source code segments A-N (803-805) do not meet a set of parallel multi-thread processing recommendation criteria.

The system identifies the source code segment N+1 (806) as being a candidate for parallel multi-thread processing. In particular, the system identifies source code 806*a* within the source code segment 806 as performing a sequentially-executed counting process for counting occurrences of a word in a set of text corresponding to a digitally-stored book. Based on a size of the set of text, the system estimates that the process would last at least a threshold duration of time. The system further determines that the source code segment 806 does not include any data dependencies with any other source code segments.

Based on determining that the source code segment 806 meets the parallel multi-thread processing recommendation criteria, the system rewrites the source code 806*a* to perform the same process for counting the particular word in the particular set of text, while utilizing multiple threads to execute the process.

Figure 8B:
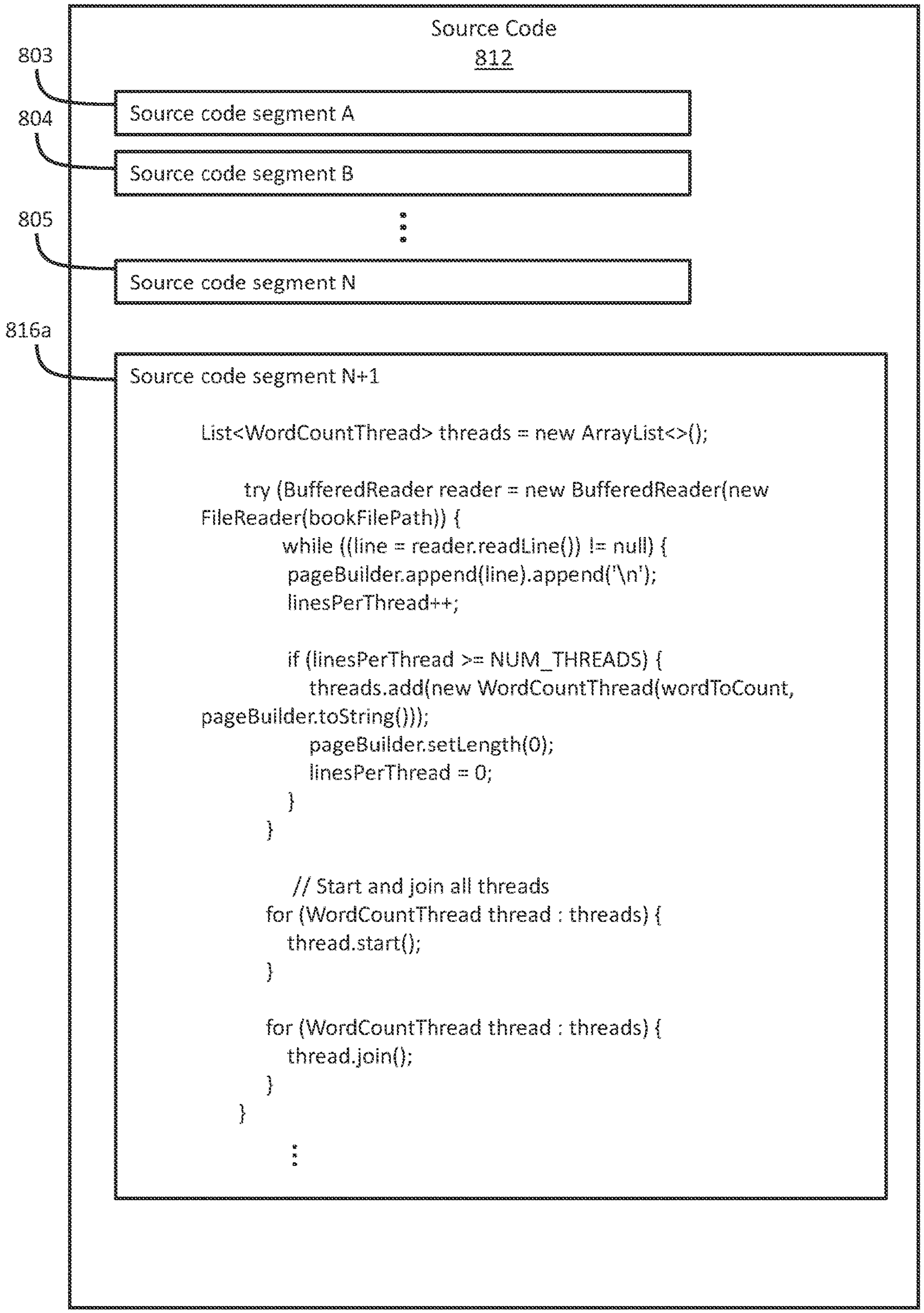
Figure 8C:
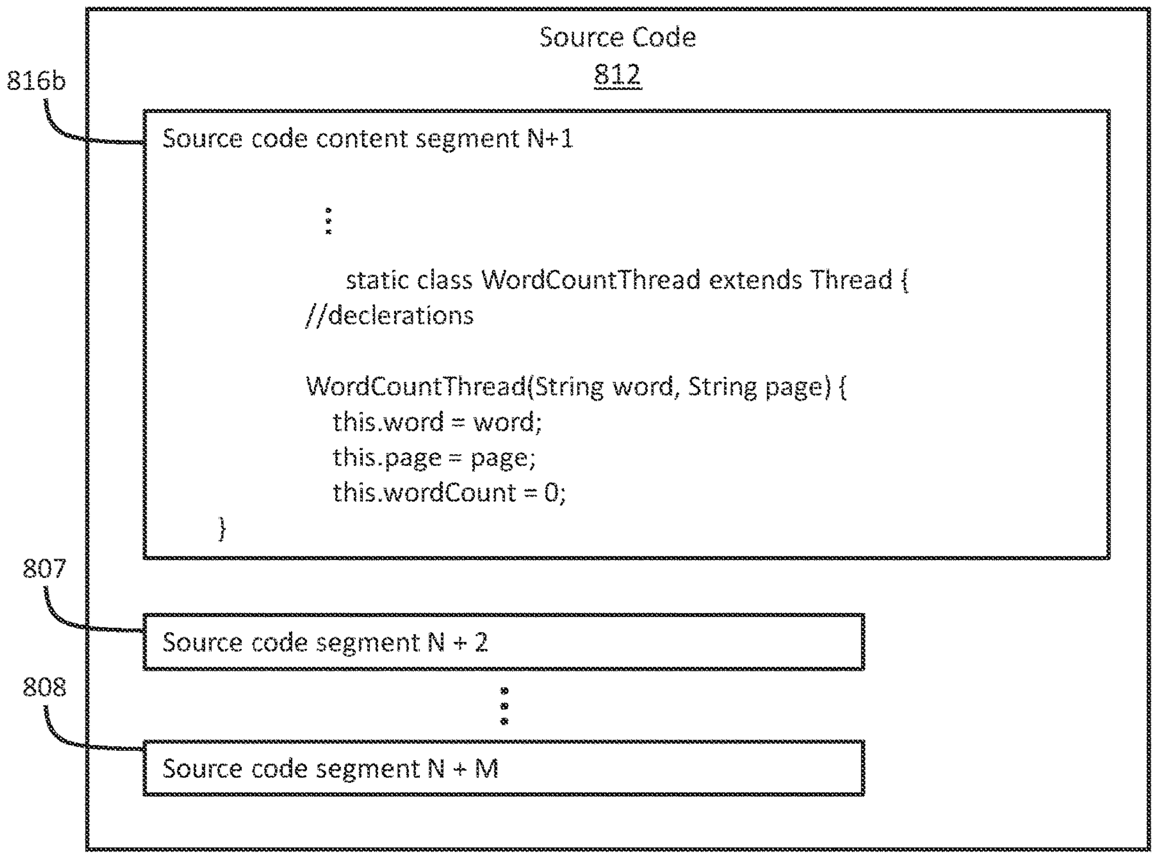

In particular, as illustrated in FIGS. 8B and 8C, the system generates a set of modified source code 816*a* and 816*b* that generates a separate thread for each page of the digitally-stored book. Each thread counts the occurrences of the particular word on the respective page of the digitally-stored book. When the system executes a set of compiled code corresponding to the modified set of source code 816*a* and 816*b*, two or more threads may execute simultaneously to count occurrences of the word on respective pages of the digitally-stored book. Each thread increments a variable representing a total number of occurrences of the word in the digitally-stored book. Upon completion of one thread, another thread initiates. The result of the execution of all the threads is the sum of the occurrences of the word in the digitally-stored book.

In one or more embodiments, the system presents a notification to a user with a recommendation for modifying the source code. For example, the system may generate a notification saying: "The system has identified an operation "WordCount" that may be implemented with parallel multi-thread processing. Implementation with parallel multi-thread processing is estimated to reduce execution time from 30 sec. to 5 sec. Do you accept the recommended modification?" A user may indicate via a graphical user interface whether to accept or reject the modification to the source code.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
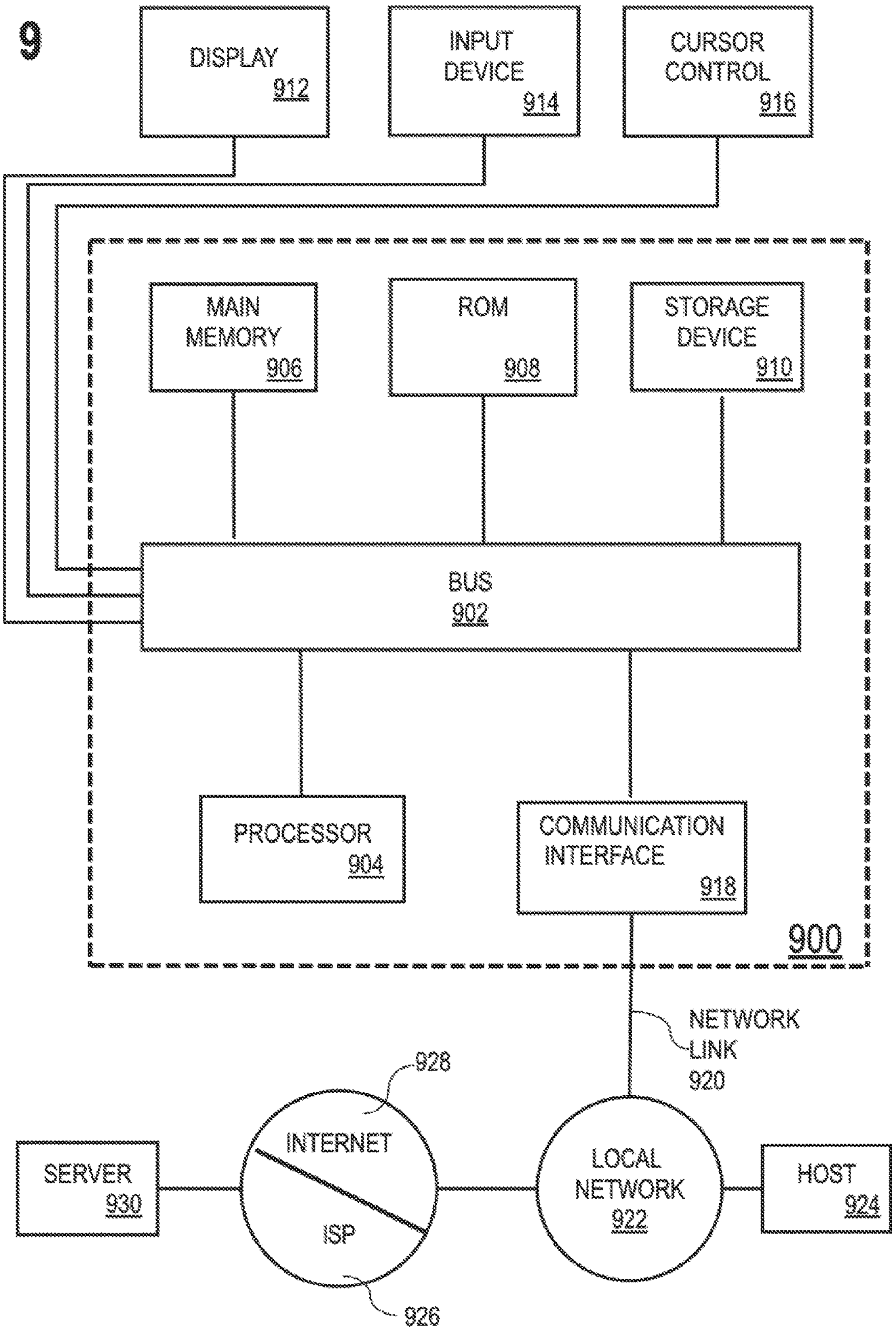
FIG. 9 shows a block diagram that illustrates a computer system in accordance with one or more embodiments.

For example, FIG. 9 is a block diagram that illustrates a computer system 900 upon which an embodiment of the disclosure may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic that in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, that carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiment, and what is intended by the applicants to be the scope of the embodiment, is the literal and equivalent scope of the set of claims that issue from this application, in the specific form in that such claims issue, including any subsequent correction.

What is claimed is:

1. One or more non-transitory computer readable media comprising instructions that, when executed by one or more hardware processors, cause the one or more hardware processors to perform operations comprising:

analyzing a set of code to identify a first set of operations and a second set of operations to be executed by the set of code;

determining that there are no operational dependencies between the first set of operations and the second set of operations; and responsive at least to determining that there are no operational dependencies between the first set of operations and the second set of operations:

generating a code modification recommendation that recommends using different threads, of a plurality of threads, for executing the first set of operations and the second set of operations.

2. The one or more non-transitory computer readable media of claim 1, wherein determining that there are no operational dependencies between the first set of operations and the second set of operations comprises determining that the first set of operations and the second set of operations do not access a same data set.

3. The one or more non-transitory computer readable media of claim 1, wherein determining that there are no operational dependencies between the first set of operations and the second set of operations comprises determining an order in which the first set of operations and the second set of operations access a dataset is interchangeable.

4. The one or more non-transitory computer readable media of claim 1, wherein the operations further comprise:

identifying a modified set of code, generated from the set of code, such that:

the first set of operations are executed by a first thread of the plurality of threads and the second set of operations are executed by a second thread of the plurality of threads; and thread consistency is maintained such that computations by the first thread are not discarded by the second thread and computations by the second thread are not discarded by the first thread, wherein the code modification recommendation is based on the modified set of code.

5. The one or more non-transitory computer readable media of claim 1, wherein analyzing the set of code to identify the first set of operations and the second set of operations to be executed by the set of code comprises: identifying a first subset of code of the set of code that is configured to execute the first set of operations and a second subset of code of the set of code that is configured to execute the second set of operations.

6. The one or more non-transitory computer readable media of claim 1, wherein the first set of operations are to be executed by a first execution of a subset of the set of code, and wherein the second set of operations are to be executed by a second execution of the subset of the set of code.

7. The one or more non-transitory computer readable media of claim 1, wherein generating the code modification recommendation is further based on applying a trained machine learning model to the set of code to predict a performance metric improvement associated with modifying the set of code to utilize parallel multi-thread processing, wherein the operations further comprise:

training a machine learning model to predict performance metric improvements associated with modifying static source code to utilize parallel multi-thread processing, wherein training the machine learning model comprises:

obtaining training data sets, each training data set of historical source code data comprising:

source code characteristics of a source code segment, the source code characteristics comprising at least one of:

a number of threads used to execute a set of compiled code corresponding to the source code segment;

a run time for executing the set of compiled code;

a number of variables included in the source code segment;

a type of operation specified in the source code segment;

an estimated computing resource usage corresponding to the set of compiled code; and a length of the source code segment;

generating a feature vector for the source code segment based on the source code characteristics; and training the machine learning model based on the training data sets;

applying the machine learning model to a set of source code including the first set of operations and the second set of operations to predict performance metric improvements associated with modifying the set of source code to utilize parallel multi-thread processing at least by:

identifying particular source code characteristics of the set of source code;

generating a particular feature vector based on the particular source code characteristics; and applying the machine learning model to the particular feature vector to generate a particular prediction specifying a particular performance metric improvement associated with modifying the set of source code to utilize parallel multi-thread processing, wherein the code modification recommendation is generated based at least upon: (a) determining that there are no operational dependencies between the first set of operations and the second set of operations, and (b) determining the particular performance metric improvement exceeds a threshold value.

8. The one or more non-transitory computer readable media of claim 1, wherein the operations further comprise: based on the code modification recommendation, causing execution of the first set of operations using a first thread and causing execution of the second set of operations using a second thread that is different from the first thread.

9. A method comprising:

analyzing a set of code to identify a first set of operations and a second set of operations to be executed by the set of code;

determining that there are no operational dependencies between the first set of operations and the second set of operations; and responsive at least to determining that there are no operational dependencies between the first set of operations and the second set of operations:

generating a code modification recommendation that recommends using different threads, of a plurality of threads, for executing the first set of operations and the second set of operations.

10. The method of claim 9, wherein determining that there are no operational dependencies between the first set of operations and the second set of operations comprises determining that the first set of operations and the second set of operations do not access a same data set.

11. The method of claim 9, wherein determining that there are no operational dependencies between the first set of operations and the second set of operations comprises determining an order in which the first set of operations and the second set of operations access in a dataset is interchangeable.

12. The method of claim 9, further comprising:

identifying a modified set of code, generated from the set of code, such that:

the first set of operations are executed by a first thread of the plurality of threads and the second set of operations are executed by a second thread of the plurality of threads; and thread consistency is maintained such that computations by the first thread are not discarded by the second thread and computations by the second thread are not discarded by the first thread, wherein the code modification recommendation is based on the modified set of code.

13. The method of claim 9, wherein analyzing the set of code to identify the first set of operations and the second set of operations to be executed by the set of code comprises: identifying a first subset of code of the set of code that is configured to execute the first set of operations and a second subset of code of the set of code that is configured to execute the second set of operations.

14. The method of claim 9, wherein the first set of operations are to be executed by a first execution of a subset of the set of code, and wherein the second set of operations are to be executed by a second execution of the subset of the set of code.

15. The method of claim 9, wherein generating the code modification recommendation is further based on applying a trained machine learning model to the set of code to predict a performance metric improvement associated with modifying the set of code to utilize parallel multi-thread processing, wherein the method further comprises:

training a machine learning model to predict performance metric improvements associated with modifying static source code to utilize parallel multi-thread processing, wherein training the machine learning model comprises:

obtaining training data sets, each training data set of historical source code data comprising:

source code characteristics of a source code segment, the source code characteristics comprising at least one of:

a number of threads used to execute a set of compiled code corresponding to the source code segment;

a run time for executing the set of compiled code;

a number of variables included in the source code segment;

a type of operation specified in the source code segment;

an estimated computing resource usage corresponding to the set of compiled code; and a length of the source code segment;

generating a feature vector for the source code segment based on the source code characteristics; and training the machine learning model based on the training data sets;

applying the machine learning model to a set of source code including the first set of operations and the second set of operations to predict performance metric improvements associated with modifying the set of source code to utilize parallel multi-thread processing at least by:

identifying particular source code characteristics of the set of source code;

generating a particular feature vector based on the particular source code characteristics; and applying the machine learning model to the particular feature vector to generate a particular prediction specifying a particular performance metric improvement associated with modifying the set of source code to utilize parallel multi-thread processing, wherein the code modification recommendation is generated based at least upon: (a) determining that there are no operational dependencies between the first set of operations and the second set of operations, and (b) determining the particular performance metric improvement exceeds a threshold value.

16. A system comprising:

at least one device including a hardware processor, the system being configured to perform operations comprising:

analyzing a set of code to identify a first set of operations and a second set of operations to be executed by the set of code;

determining that there are no operational dependencies between the first set of operations and the second set of operations; and responsive at least to determining that there are no operational dependencies between the first set of operations and the second set of operations:

generating a code modification recommendation that recommends using different threads, of a plurality of threads, for executing the first set of operations and the second set of operations.

17. The system of claim 16, wherein determining that there are no operational dependencies between the first set of operations and the second set of operations comprises determining that the first set of operations and the second set of operations do not access a same data set.

18. The system of claim 16, wherein determining that there are no operational dependencies between the first set of operations and the second set of operations comprises determining an order in which the first set of operations and the second set of operations access in a dataset is interchangeable.

19. The system of claim 16, wherein the operations further comprise:

identifying a modified set of code, generated from the set of code, such that:

the first set of operations are executed by a first thread of the plurality of threads and the second set of operations are executed by a second thread of the plurality of threads; and thread consistency is maintained such that computations by the first thread are not discarded by the second thread and computations by the second thread are not discarded by the first thread, wherein the code modification recommendation is based on the modified set of code.

20. The system of claim 16, wherein analyzing the set of code to identify the first set of operations and the second set of operations to be executed by the set of code comprises: identifying a first subset of code of the set of code that is configured to execute the first set of operations and a second subset of code of the set of code that is configured to execute the second set of operations.

21. The system of claim 16, wherein the first set of operations are to be executed by a first execution of a subset of the set of code, and wherein the second set of operations are to be executed by a second execution of the subset of the set of code.

* * * * *